(12) United States Patent
Wang et al.

(10) Patent No.: US 9,781,906 B2
(45) Date of Patent: Oct. 10, 2017

(54) METHOD FOR CONSTRUCTING CAGE BODY OF TAPERED CAGE ASSEMBLED IN RIGID-FLEXIBLE MANNER

(75) Inventors: Lumin Wang, Shanghai (CN); Jiangao Shi, Shanghai (CN); Yongli Liu, Shanghai (CN)

(73) Assignee: EAST CHINA SEA FISHERY RESEARCH INSTITUTE CHINESE ACADEMY OF FISHERY SCIENCES, Shanghai (CN)

( * ) Notice: Subject to any disclaimer, the term of this patent is extended or adjusted under 35 U.S.C. 154(b) by 468 days.

(21) Appl. No.: 14/350,493

(22) PCT Filed: Apr. 17, 2012

(86) PCT No.: PCT/CN2012/000526
§ 371 (c)(1),
(2), (4) Date: Apr. 8, 2014

(87) PCT Pub. No.: WO2013/120235
PCT Pub. Date: Aug. 22, 2013

(65) Prior Publication Data
US 2014/0359999 A1    Dec. 11, 2014

(30) Foreign Application Priority Data
Feb. 16, 2012   (CN) .......................... 2012 1 0034535

(51) Int. Cl.
*A01K 61/00*    (2017.01)
*A01K 97/05*    (2006.01)
(Continued)

(52) U.S. Cl.
CPC .............. *A01K 61/00* (2013.01); *A01K 61/54* (2017.01); *A01K 61/60* (2017.01); *A01K 61/70* (2017.01);
(Continued)

(58) Field of Classification Search
CPC ...... A01K 61/007; A01K 61/00; A01K 61/02; A01K 61/006; A01K 61/002; A01K 63/00;
(Continued)

(56) References Cited

U.S. PATENT DOCUMENTS

| | | | | |
|---|---|---|---|---|
| 4,164,199 A | * | 8/1979 | Pequegnat | A01K 61/00 119/200 |
| 4,170,196 A | * | 10/1979 | Yoneya | A01K 63/00 119/223 |
| 4,957,064 A | * | 9/1990 | Koma | A01K 61/60 119/223 |

(Continued)

FOREIGN PATENT DOCUMENTS

GB    2441955 A  *  3/2008  ............. A01K 97/20

*Primary Examiner* — Christopher Besler
*Assistant Examiner* — Bayan Salone

(57) ABSTRACT

A method for constructing a cage body of a tapered cage assembled in a rigid-flexible manner includes steps as follows. A cage body of a tapered aquaculture cage is assembled by combining a rigid-structure copper alloy stretched mesh and a flexible synthetic fiber mesh. Pipe rings mounted on the standard component of the synthetic fiber mesh are mated in a staggered manner with plugging rings on the standard component of the copper alloy stretched mesh, and high-performance synthetic fiber rope is rove through the pipe rings and the plugging rings; in this way, the connection is completed. The cage effectively improves the cage resilience under the ocean current condition, avoids mesh sheet deformation or corner breakage, enhances the water exchange capability in and out of the cage body of the gravity cage, and effectively improves the growth environment for the fishes farmed in the cage body.

7 Claims, 1 Drawing Sheet

(51) Int. Cl.
*A01K 97/20* (2006.01)
*A01K 61/02* (2006.01)
*A01K 73/12* (2006.01)
*A01K 61/54* (2017.01)
*A01K 61/70* (2017.01)
*A01K 61/60* (2017.01)
*A01K 63/00* (2017.01)
*A01K 63/02* (2006.01)
*B21D 53/00* (2006.01)

(52) U.S. Cl.
CPC ............... *A01K 63/00* (2013.01); *A01K 63/02* (2013.01); *A01K 73/12* (2013.01); *B21D 53/00* (2013.01); *Y10T 29/49826* (2015.01); *Y10T 29/49863* (2015.01); *Y10T 29/49877* (2015.01)

(58) Field of Classification Search
CPC ........ A01K 63/02; A01K 63/04; A01K 73/12; A01K 97/20; Y10T 29/49826; Y10T 29/49863; Y10T 29/49877; B21D 49/00; B21D 53/00
USPC .......... 29/428, 446, 454; 119/223, 203, 230, 119/221, 215
See application file for complete search history.

(56) References Cited

U.S. PATENT DOCUMENTS 8,171,886 B2 * 5/2012 Oishi .................. B22D 21/025
                                                        119/215
2008/0216759 A1 * 9/2008 Oishi .................. B22D 21/025
                                                        119/223

* cited by examiner

METHOD FOR CONSTRUCTING CAGE BODY OF TAPERED CAGE ASSEMBLED IN RIGID-FLEXIBLE MANNER

FIELD OF INVENTION

The present invention belongs to a marine aquaculture equipment technology field, and more particularly involves a method for constructing the cage body of a tapered cage assembled in rigid-flexible manner which possesses good volume maintaining performance and netting antifouling at higher seawater velocity.

DESCRIPTION OF RELATED ARTS

According to the construction methods of the cage body of the cage, the marine aquaculture cage can be divided into the gravity type, the mooring tension type, the self-tension type or self-supporting type cages. According to the status thereof in the water, the marine aquaculture cage can be divided into the floating type, the submersible type and the lifting type. The present invention aims at the cage body material, the structure and the assembling method of the gravity marine aquaculture cage.

The existing gravity cage can be divided into the floating type or the lifting type. Its buoyancy frame is made of high density polyethylene floating tubes, metal material, wood material combined with buoyancy material, while its cage body is created by hanging sinkers on the bottom of the cage (mesh bag), which is formed by assembling synthetic fiber woven meshes together. The shapes of the buoyancy frame can be round, hexagonal, square, marsupial and so on, and the structure shapes of the cage body of the cage can be a cylinder, a square cylinder, a multilateral cylinder and so on. The round and square cages are most widely used at home and abroad. The advantages of this kind of cage equipment are relatively lower cost and convenient aquaculture operation; the round buoyancy frame cage assembled by welding the high density polyethylene floating tube also has good anti-wave resistance, and the lifting cage added with ups and downs control device can effectively withstand typhoons, red tide and other disasters. The disadvantages thereof is that the cage body assembled by synthetic fiber netting has serious fouling attachment during aquaculture production, so that the water exchange between inside and outside of the cage is not smooth, which leads to reduced water environment quality within the cage when cultivated with high density of fishes; simultaneously, the rheological deformation resistance of the synthetic fiber cage body (mesh bag) is relatively poor, which results in serious drifting and high volume loss rate in the sea area with high velocity, so that the cultivated fishes in the cage are extruded and damaged, thus affecting the health and normal growth of the cultivated fishes.

Similarly, with the increase of the proportion of selected material in the structure, the cage with buoyancy frame produced by the high density polyethylene floating tube, the metal material and the wood material combined with the buoyancy material and the cage body formed by the copper alloy mesh, the galvanized steel wire mesh and the steel wire mesh coated with plastics, when compared to that assembled by the synthetic fiber woven netting, has reduced drifting and volume loss at high seawater flow velocity. Especially, the application of the copper alloy mesh in the construction of the cage body, due to excellent biofouling resistance of copper alloy itself, can better solve the outstanding problem that the cage body has serious fouling attachment during the aquaculture production, which in turn affected the water exchange between inside and outside of the cage body. Consequently, the water environment quality within the cage body cultivated with the high density fishes can be effectively improved, thereby providing an excellent health growth environment for cultivating fishes.

Currently, the copper alloy mesh applied to the gravity marine aquaculture cage body comprises the orthorhombic mesh with semi-flexible structure and the stretched and welded mesh with rigid structure. Amongst these cages, the copper alloy orthorhombic mesh with the structure formed by assembling several wavy copper wires together in parallel is commonly used. Its advantages are that the cage body has stronger deformation resistance under seawater, and therefore is not easy to break. Moreover, the connection between meshes is convenient because the cage body can be rolled along the single axial direction for convenient transportation; its disadvantages are that the junction points of the mesh formed by hooks is movable and therefore keep moving and rubbing against each other under wave and flow in the sea, which results in damage. The copper alloy stretched mesh with diamond meshes is made by punching on copper alloy plate and stretched the plate afterward. One characteristic of the copper alloy stretched mesh is that the rigid structure of the mesh can prevent wear and tear; the disadvantages thereof are that the complicated connecting procedure during construction and the poor deformation resistance under sea flow due to rigid structure will easily cause netting deformation or corner breakage. The copper alloy welded mesh is produced by welding two mutually perpendicular copper wires at the junction point and then forming the netting with square meshes in turn. Besides the same characteristics as the stretched mesh possesses, the seawater corrosive resistance of the welded mesh at the welded points is relatively poor.

SUMMARY OF THE PRESENT INVENTION

The technical problem that the present invention aims to resolve is to provide a method for assembling the rigid copper alloy stretched mesh and the flexible synthetic fiber mesh together to form the cage body of a tapered cage in a rigid-flexible manner, which can solve a variety of technical difficulties including: promoting the convenient and quick connection between the flexible nettings of the copper alloy stretched mesh; improving the deformation resistance of the constructed cage body under the sea flow, thereby preventing the netting deformation or the corner breakage problems of the copper alloy stretched mesh; increasing the water exchange ability inside and outside the gravity cage body and reducing the volume loss of the cage body in high seawater flow velocity environment, therefore effectively improving the growth environment of the aquaculture fishes in the cage body.

The technical solution of the present invention to resolve the technical problem is to provide a method for constructing cage body of tapered cage assembled in rigid-flexible manner, wherein a rigid copper alloy stretched net and a flexible synthetic fiber net are assembled to the cage body of the tapered marine aquaculture cage. The structure of the cage body of the cage, from upper to lower, comprises a first segment net circle, a second segment net circle, a third segment net circle, a fourth segment net circle and a bottom net. The first segment net circle and the third segment net circle are produced by assembling a long strip netting standard component made of a knotted net woven by the flexibly connected flexible synthetic fiber net cable; the second segment net circle and the fourth segment net circle are produced by alternately assembling a standard component prepared by a copper alloy stretched net and an isosceles trapezoid netting standard component prepared by the flexible synthetic fiber net; the bottom net is prepared by the flexible synthetic fiber net; the method is characterized by comprising steps of:

(1) selecting a rectangular copper alloy stretched net with four peripheries wrapped for reinforcement by an ultra high molecular weight polyethylene sheet material, and pre-preparing a docking ring for quick connection to prepare the copper alloy stretched net standard component;

(2) selecting the high performance synthetic fiber net to weave the knotted net, and cutting the net after stretching heat shaping and resin consolidation treatment in order to produce a net with a fixed mesh size and fixed longitudinal and lateral mesh amount; producing long trip synthetic fiber netting and isosceles trapezoid synthetic fiber netting by assembling a first high performance synthetic fiber rope, and pre-assembling a tube ring by cutting the ultra high molecular weight polyethylene tube into segments and assembling the first rope, wherein a distribution component of the tube ring is staggeredly corresponding to the pre-assembled docking ring at the periphery of the copper alloy stretched net standard component, so that the long strip and isosceles trapezoid synthetic fiber netting standard components are prepared;

(3) selecting the high performance synthetic fiber net, cutting and assembling the bottom net in order to preset the shape and the size of the bottom, performing reinforcement on the bottom net, assembling a second high performance synthetic fiber rope at the periphery of the bottom net, pre-assembling a tube ring by cutting the ultra high molecular weight polyethylene tube into segments while assembling the second rope, wherein a distribution component of the tube ring is staggeredly corresponding to the above mentioned docking ring pre-assembled on the copper alloy stretched net standard component and the synthetic fiber netting standard component, thus preparing the bottom net component of the case body of the tapered cage which is capable of quickly assembling; and (4) assembling the case body, which comprises following procedure: first of all, install the long strip synthetic fiber netting components on a rope at the top end of the case body, which is used to connect the case body with the case frame to produce the first segment of the synthetic fiber net circle starting from the tying position to the waterline; after that, staggeredly assemble the pre-installed tube ring with the docking tube ring installed at the short edge of the copper alloy stretched standard component and finish connection by threading a third high performance synthetic fiber rope through the tube rings; then connect the long edge of the copper alloy stretched standard component with the tube rings on the lateral side of the isosceles trapezoid synthetic net standard component and thread the third rope through the tube ring and the docking tube ring; similarly, produce the second segment of the net circle by assembling the long base of the isosceles trapezoid synthetic net standard component with the bottom of the first net circle; then produce the third segment of the net circle by assemble the other short edge of the copper alloy stretched net and the short base of the isosceles trapezoid synthetic fiber net standard component with the long strip synthetic fiber net standard component in the same method—that is, by matching the tube rings and threading the third rope through the rings; the method of producing the fourth segment of the net circle, which is assembled by the copper alloy stretched net and the isosceles trapezoid synthetic fiber net, is the same to that of producing the second one, however, the length of the long base of the trapezoid net equals to the short base of that of the second segment; the tube rings at the bottom of the fourth segment is matched with the tube rings on the synthetic fiber bottom net and connected with rope; after these steps, the cage body of the tapered gravity cage assembled by the rigid copper alloy stretched net and the flexible synthetic fiber net will be successfully constructed.

In the step (1), the four peripheries are wrapped and reinforced using the ultra high molecular weight polyethylene sheet material. If the ultra high molecular weight polyethylene sheet material reinforcement is replaced with the copper alloy plate material the copper alloy material stretched net standard component can be prepared.

In the production method of the copper alloy stretched net standard component in the step (1), the long strip ultra high molecular weight polyethylene sheet material with excellent strength, weather resistance and abrasion resistance is used. A row of square holes are punched in the middle thereof and are aligned along the long edge of the long strip ultra high molecular weight polyethylene sheet material; after the long strip ultra high molecular weight polyethylene sheet material punched with the square holes is curled along the short side and then heat set, a slit cylindrical member with two extended wing edges at an opening thereof is prepared; the above mentioned cylindrical member is fusion welded with the copper alloy stretched net and supplemented by a rivet for reinforcement. The concrete method is firstly an edge of the copper alloy stretched net is heated, and then an upper and lower surface of the edge of the heated copper alloy stretched net is coated with the two extended wing edges at the opening of the cylindrical member prepared by the ultra high molecular weight polyethylene sheet material and a force is applied thereto, and cooled under the maintaining pressure for completing the fusion welding of the edge of the copper alloy stretched net and the cylindrical member prepared by the ultra high molecular weight polyethylene sheet material, the two extended wing edges at the opening of the ultra high molecular weight polyethylene cylindrical member welded to the edge of the copper alloy stretched net are reinforced by opposite installing copper rivets, so that the edge of the copper alloy stretched net is coated with the ultra high molecular weight polyethylene sheet material and the docking ring for quick connection is prepared, thus the copper alloy stretched net standard component is prepared by treating four edges of the copper alloy stretched net via the method.

The method of replacing the copper alloy plate material with the ultra-high molecular weight polyethylene sheet material in wrapping reinforcement is to produce the seamed copper alloy cylindrical member with two extended wing edges prepared by mechanical repression. The upper and lower surfaces of the copper alloy stretched net are coated with the two extended wing edges, and oppositely riveted by the copper rivet in order to prepare the copper alloy stretched net standard component.

In step (2), the stretched heat setting and resin consolidated high performance synthetic fiber diamond knotted netting is cut according to a setting longitudinal and lateral mesh amount, and then the rope is assembled at the periphery of the netting based on a contraction coefficient for preparing a rectangular netting; a rope which is preinstalled on the tube ring which is formed by cutting the ultra high molecular weight polyethylene tube into segment, the ultra high molecular weight polyethylene tube ring is evenly distributed according to a preset distance, and then the rope which is preinstalled on the tube ring is laid outside the rope in parallel at the periphery of the square netting, and tightly tied with the first assembled rope at the periphery of the rectangular netting by high strength net cables for preparing the long strip synthetic fiber netting standard component; the high performance synthetic fiber diamond knotted netting is transversely cut according to the set mesh amount of the upper and lower end, and bilaterally symmetrically cut, the first rope is assembled at the periphery of the netting and the rope preinstalled the ultra high molecular weight polyethylene tube ring is tied for preparing the isosceles trapezoid synthetic fiber netting standard component.

In step (3), the bottom net of the case body uses the high performance synthetic fiber diamond knotted netting, the netting is cut and assembled according to the shape and area of the bottom of the case body of the tapered cage, and the forced rope is radically assembled with a forced rope from a central point of the bottom net; a second rope preinstalled with the tube ring formed by segment cutting the ultra high molecular weight polyethylene tube is located at the periphery of the bottom net, so that the ultra high molecular weight polyethylene tube ring is evenly distributed according to the preset distance, and then the second rope preinstalled with the tube ring is parallel laid outside the rope at the periphery of the bottom net, and tied with the second assembled rope at the periphery of the bottom net by the high strength net cable for assembling the rope installed with the ultra high molecular weight polyethylene tube ring for preparing the bottom net which is capable of quickly connecting by staggered mating and penetrating the second synthetic fiber rope into the tube ring.

The flexible synthetic fiber net is the polyamide braided knotted net.

Beneficial Effects

Compared with the prior art, the present invention has some advantages as follows:

1. The present invention has the copper alloy stretched mesh with the rigid characteristics, after wrapping reinforcement at the periphery, the corner strength of the mesh is greatly improved; simultaneously, after the rigid copper alloy stretched mesh standard component is assembled with the flexible synthetic fiber netting to form the cage body, the flexible netting turns to be the stress intersection point of the cage body deformation under the water flow, so that the deformation and corner breakage of the copper alloy stretched mesh caused by the cage body deformation is prevented.

2. Aiming at the characteristics of the current collection drifting and the cage body deformation of the gravity cage netting, by the tapered cage body structure, via the gravity characteristic of the copper alloy stretched mesh itself, the drifting of the current facing surface netting of the cage body is reduced, the volume loss of the cage body and the resulting extrusion damage of the aquaculture fishes is reduced; simultaneously, due to the gravity of the tapered structure and the copper alloy stretched mesh themselves, the flexible synthetic fiber netting for connecting with the copper alloy stretched mesh is always maintained in the tension state, thus the wear and tear of the rigid copper alloy stretched mesh to the flexible synthetic fiber netting.

3. The prepared copper alloy stretched mesh standard component and the synthetic fiber netting standard component are used, which is capable of being quickly assembled into the cage body, the cage body still can be folded after assembling, which is convenient to assemble on site, transport and replace the part of the damaged components after long-term usage.

4. The high performance synthetic fiber net is used at the upper and lower segment of the water surface at the upper end of the cage body, so that the copper alloy stretched mesh is always under the water, thus the accelerated corrosion of the copper alloy stretched mesh at the alternate site of the water surface seawater and the air can be prevented; the upper end synthetic net circle after long-term usage can be conveniently replaced, so that the service life of the main cage body is extended.

5. Compared with the copper alloy orthorhombic mesh cage body, the copper alloy stretched mesh of the present invention itself has no contact friction, which can prevent the cage damage and the copper alloy material loss of the orthorhombic mesh hanging point caused by the contact friction, the enrichment amount of the copper metal in the aquaculture seas is reduced; the 70-80% area of the tapered cage body structure assembling in rigid-flexible manner is made up of the copper alloy stretched mesh with excellent anti marine fouling organisms, which can maintain the demand of the health growth of the aquaculture fishes in the cage body for the water exchange ability inside and outside the cage body for a long time.

DETAILED DESCRIPTION OF THE PREFERRED EMBODIMENT

The present invention is further explained in detail with the accompanying embodiments. It should be understood that these embodiments are only intended to illustrate the present invention and are not intended to limit the scope of the present invention. Furthermore, it should be understood that after reading the contents of the present invention, the person skilled in the art can make various changes or modification to the present invention, and these equivalent forms also fall within the scope limited by the appended claims of the present application.

Figure 1:
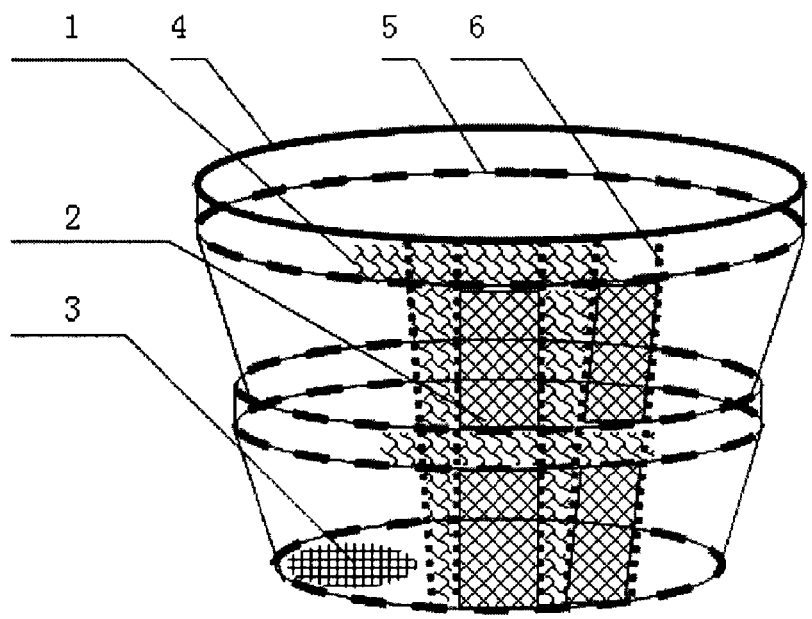
FIG. 1 is a structurally schematic view of a tapered cage body of the present invention.
Figure 2:
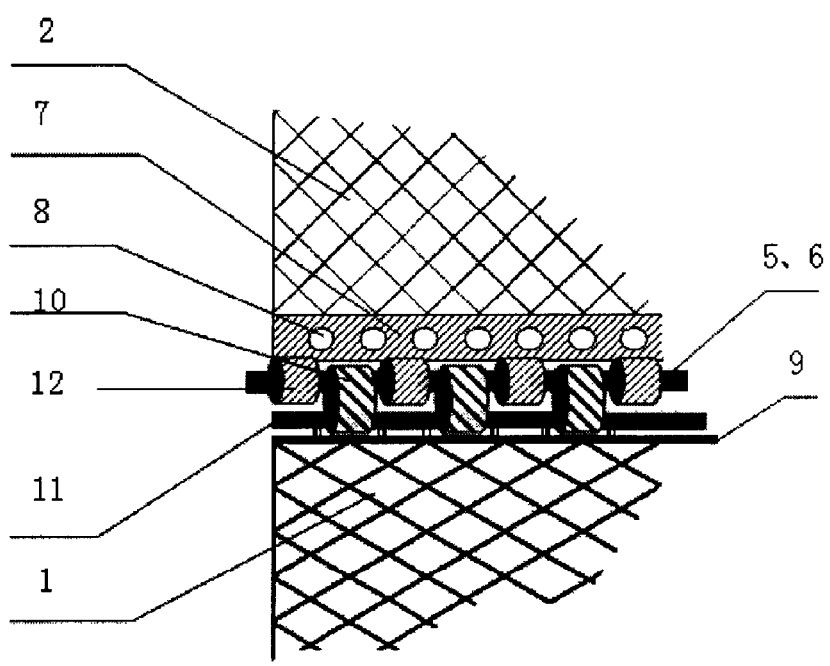
FIG. 2 is an assembling schematic view of the standard assemblies of the present invention.

As shown in FIGS. 1 and 2, the cage body of the present invention is alternately assembled by the rigid rectangular copper alloy stretched mesh 2, the elongated flexible synthetic fiber net and the isosceles trapezoid synthetic fiber net to form the cone. The rigid copper alloy stretched mesh 2 and the flexible synthetic fiber net 1 are respectively made into the standard assemblies preinstalled with the staggered mating docking ring 12 and the tube ring 10, the standard component can be quickly connected with each other by staggered mating and penetrating the synthetic fiber ropes through the tube ring and the connector or between the tube rings. The cage body comprises the first segment (the segment from the upper water surface to the lower water surface) and the third segment synthetic fiber net circle for flexible connection which are assembled by the long strip netting standard component made of polyamide braided knotted net, the second and fourth segment net circles which are alternately assembled by the standard component made of the copper alloy stretched mesh 2 and the isosceles trapezoid netting standard component made of polyamide braided knotted net, and the assembled bottom net made of the high strength polyethylene mesh warp 3 which is capable of quickly connection and assembling with the fourth segment net circle; the rope 4, the rope 5 for horizontal connection among every segment net circle, and the rope 6 for connecting between the copper alloy stretched mesh standard component and the isosceles trapezoid polyamide braided knotted net standard component and the case vertical belly line.

The copper alloy plate is made of copper alloy with the specification of 1000 mm (width)×2 mm (thickness), and then is made into the diamond meshed copper alloy stretched netting whose specification is 1000 mm (width)×2000 mm (length), the mesh size of the diamond mesh is 2 mm (width)×2 mm (thickness), the length of the single mesh is 20 mm-30 mm, the length ratio of the diagonal is 0.57 after being caulked, stretched, flatly crushed and cut. The specification of the ultra high molecular weight polyethylene sheet material is 1000 mm (length)×80 mm (width)×3 mm-4 mm (thickness), a row of square holes are punched in the middle thereof, the side length of every square hole is 40 mm, the distance of the adjacent sides of two holes is 30 mm; after the long strip ultra high molecular weight polyethylene sheet material punched with square holes is curled along the short side and then heat set, the slit cylindrical member 7 with two extended wing edges at the opening; the edges of the copper alloy stretched netting are coated with the two extended wing edges at the opening of the cylindrical member, fusion welded and supplemented by the rivet 8 for reinforcement, so that the copper alloy stretched mesh standard component with the ultra high molecular weight polyethylene sheet material tipping and tube ring.

The polyamide braided wire with six or eight shares, 3000-3200 integrated linear density (Rtex) is woven to the knotted netting with the mesh size (2a) of 40 mm-60 mm, and then heat set and resin treated. The above mentioned netting is cut to the long strip netting according to the set vertical and horizontal meshes, and the high strength polyethylene three-share rope 9 with the nominal diameter of 6 mm is assembled along the peripheral of the netting according to the contraction coefficient of 0.65. A pre-reeved ultra high molecular weight polyethylene oval tube is segmented cut to the tube ring 10, and the high strength polyethylene eight-share rope 11 with the nominal diameter of 10 mm, and then parallel laid outside the ropes at the peripheral of the netting and tightly tied with the assembled ropes at the peripheral of the netting by the high strength net wire, so that two long strip polyamide braided knotted net standard assemblies with the height of multiples of 800 mm and the length of multiples of 1600 mm and the height of multiples of 400 mm and the length of multiples of 1400 mm are prepared. The heat-set and resin-treated polyamide braided knotted netting is horizontally and vertically cut to the isosceles trapezoid netting according to the set meshes, and then installed with the rope 9, plugged with the tube ring 10, and laid with the rope 11 along the peripheral edge thereof based on the above mentioned method, so that two isosceles trapezoid polyamide braided knotted net standard assemblies with the specification of 600 mm (long bottom edge)×400 mm (short bottom edge)×2000 mm (waist edge) and 400 mm (long bottom edge)×200 mm (short bottom edge)×2000 mm (waist edge) are prepared.

While assembling the cage, the upper end of the first segment net circle is assembled to the high strength polyethylene eight-share rope 4 with the nominal diameter of 16 mm for tying the cage with the cage frame, the lower end thereof is staggered plugged by the preinstalled ultra high molecular weight polyethylene tube ring 10 and penetrated through the high strength polyethylene eight-share rope 5 with the nominal diameter of 12 mm, so that the first segment net circle is alternately connected with the second segment 30 copper alloy stretched net standard component short edges with the specification of 1000 mm×2000 mm, with the 30 isosceles trapezoid polyamide braided knotted net standard component long edges with the specification of 600 mm (long bottom edge)×400 (short bottom edge)×2000 mm (waist edge). By the same tube ring staggered mating and the synthetic fiber rope penetrating through the tube ring method, the third segment long strip polyamide braided knotted net standard component with the height of 400 mm is connected, the fourth segment 30 copper alloy stretched net standard component short edges with the specification of 1000 mm×2000 mm and 30 isosceles trapezoid polyamide braided knotted net standard component long bottom edges with the specification of 400 mm (long bottom edge)×200 (short bottom edge)×2000 mm (waist edge) are alternately connected with each other, and the bottom net is connected. The ultra high strength (ultra high molecular weight) polyethylene fiber braided rope 6 with the nominal diameter of 12 mm penetrates through the copper alloy stretched net standard component long edge and the isosceles trapezoid synthetic fiber netting standard component waist edge, and is tightly tied with the upper rope 4 and the rope 5 crossing the tube ring at the junction, so that the conical cage is overall assembled with the upper perimeter of 48 m and the lower perimeter of 36 m.

What is claimed is:

1. A method for constructing cage body of tapered cage assembled in rigid-flexible manner, wherein a rigid copper alloy stretched net (2) and a flexible synthetic fiber net (1) are assembled to the cage body of a tapered marine aquaculture cage, a structure of the cage body of the cage from upper to lower comprises a first segment net circle, a second segment net circle, a third segment net circle, a fourth segment net circle and a bottom net, the first segment net circle and the third segment net circle are produced by assembling a long strip netting standard component made of a knotted net woven by a flexibly connected flexible synthetic fiber net cable; the second segment net circle and the fourth segment net circle are produced by alternately assembling a standard component prepared by the copper alloy stretched net (2) and an isosceles trapezoid netting standard component prepared by the flexible synthetic fiber net (1); the bottom net is prepared by the flexible synthetic fiber net (1); the method is characterized by comprising steps of:

(1) selecting a rectangular copper alloy stretched net (2) with four peripheries wrapped for reinforcement by an ultra high molecular weight polyethylene sheet material, and pre-preparing a docking ring (12) for quick connection to prepare the copper alloy stretched net standard component;

(2) selecting the high performance synthetic fiber net to weave the knotted net, cutting the net after stretching heat shaping and resin consolidation treatment in order to produce a net with a fixed mesh size and fixed longitudinal and lateral mesh amount; producing a long trip synthetic fiber netting and an isosceles trapezoid synthetic fiber netting by assembling a first high performance synthetic fiber rope (9), and pre-assembling a tube ring (10) by cutting an ultra high molecular weight polyethylene tube into segments and assembling the first rope (9), wherein a distribution component of the tube ring (10) is staggeredly corresponding to the pre-assembled docking ring (12) at a periphery of the copper alloy stretched net standard component, so that the long strip and isosceles trapezoid synthetic fiber netting standard components are prepared;

(3) selecting the high performance synthetic fiber net, cutting and assembling the bottom net in order to preset a shape and size of a bottom, performing reinforcement on the bottom net, assembling a second high performance synthetic fiber rope (6) at a periphery of the bottom net, pre-assembling a tube ring (10) by segment cutting the ultra high molecular weight polyethylene tube into segments while assembling the second rope (6), wherein a distribution component of the tube ring (10) is staggeredly corresponding to the docking ring (12) pre-assembled on the copper alloy stretched net standard component and the synthetic fiber netting standard component, thus preparing the bottom net component of the case body of the tapered cage which is capable of quickly assembling; and (4) assembling the case body comprising firstly installing the long strip synthetic fiber netting standard component on a rope (4) at a top end of the case body for connecting the case body with the case frame to produce the first segment of the synthetic fiber net circle starting from the tying position to a waterline; and then staggeredly assembling the pre-installed tube ring (10) with a docking tube ring (12) installed at a short edge of the copper alloy stretched standard component and finishing connection by threading a third high performance synthetic fiber rope (5) through the tube rings (10, 12), and then connecting the long edge of the copper alloy stretched standard component with the tube rings on the lateral side of the isosceles trapezoid synthetic net standard component and threading the third rope (5) through the tube ring (10) and the docking tube ring (12); similarly, producing the second segment of the net circle by assembling the long base of the isosceles trapezoid synthetic net standard component with the bottom of the first net circle, and then producing the third segment of the net circle by assembling the other short edge of the copper alloy stretched net and the short base of the isosceles trapezoid synthetic fiber net standard component with the long strip synthetic fiber net standard component in the same method, that is, by matching the tube rings and threading the third rope (5) through the rings; the method of producing the fourth segment of the net circle, which is assembled by the copper alloy stretched net and the isosceles trapezoid synthetic fiber net, is the same to that of producing the second one, however, a length of the long base of the trapezoid net equals to the short base of that of the second segment; the tube rings at the bottom of the fourth segment is matched with the tube rings on the synthetic fiber bottom net and connected with rope, thus the cage body of the tapered cage assembled by the rigid copper alloy stretched net (2) and the flexible synthetic fiber net (1) is constructed.

2. The method for constructing cage body of tapered cage assembled in rigid-flexible manner, as recited in claim 1, characterized in that: in the step (1), the four peripheries are wrapped and reinforced using the ultra high molecular weight polyethylene sheet material, if the ultra high molecular weight polyethylene sheet material reinforcement is replaced with the copper alloy plate material, the copper alloy material stretched net standard component can be prepared.

3. The method for constructing cage body of tapered cage assembled in rigid-flexible manner, as recited in claim 1, characterized in that: in the production method of the copper alloy stretched net standard component in the step (1), the long strip ultra high molecular weight polyethylene sheet material with excellent strength, weather resistance and abrasion resistance is used, a row of square holes are punched in the middle thereof and are spaced aligned along the long edge of the long strip ultra high molecular weight polyethylene sheet material; after the long strip ultra high molecular weight polyethylene sheet material punched with the square holes is curled along the short side and then heat set, a slit cylindrical member (7) with two extended wing edges at an opening thereof is prepared; the cylindrical member (7) is fusion welded with the copper alloy stretched net (2) and supplemented by a rivet 8) for reinforcement, the concrete method is firstly an edge of the copper alloy stretched net (2) is heated, and then an upper and lower surface of the edge of the heated copper alloy stretched net (2) is coated with the two extended wing edges at the opening of the cylindrical member (7) prepared by the ultra high molecular weight polyethylene sheet material and a force is applied thereto, and cooled under the maintaining pressure for completing the fusion welding of the edge of the copper alloy stretched net (2) and the cylindrical member (7) prepared by the ultra high molecular weight polyethylene sheet material, the two extended wing edges at the opening of the ultra high molecular weight polyethylene cylindrical member (7) welded to the edge of the copper alloy stretched net (2) are reinforced by opposite installing copper rivets (8), so that the edge of the copper alloy stretched net (2) is coated with the ultra high molecular weight polyethylene sheet material and the docking ring (12) for quick connection is prepared, thus the copper alloy stretched net standard component is prepared by treating four edges of the copper alloy stretched net (2) via the method.

4. The method for constructing cage body of tapered cage assembled in rigid-flexible manner, as recited in claim 2, characterized in that: the method of replacing the copper alloy plate material with the ultra-high molecular weight polyethylene sheet material in wrapping reinforcement is to produce a seamed copper alloy cylindrical member with two extended wing edges prepared by mechanical repression, upper and lower surfaces of the copper alloy stretched net (2) are coated with the two extended wing edges of the seamed copper alloy cylindrical member, and oppositely riveted by the copper rivet (8) for preparing the copper alloy stretched net standard component.

5. The method for constructing cage body of tapered cage assembled in rigid-flexible manner, as recited in claim 1, characterized in that: in step (2), a stretched heat setting and resin consolidated high performance synthetic fiber diamond knotted netting is cut according to a setting longitudinal and lateral mesh amount, and then the first rope (9) is assembled at a periphery of the netting based on a contraction coefficient for preparing a rectangular netting; a rope (11) which is preinstalled on the tube ring (10) formed by cutting the ultra high molecular weight polyethylene tube into segment, the ultra high molecular weight polyethylene tube ring is evenly distributed according to a preset distance, and then the rope (11) which is preinstalled on the tube ring is laid outside the first rope (9) in parallel at a periphery of the square netting, and tightly tied with the first assembled rope (9) at the periphery of the rectangular netting by high strength net cables for preparing the long strip synthetic fiber netting standard component; the high performance synthetic fiber diamond knotted netting is transversely cut according to the set mesh amount of the upper and lower end, and bilaterally symmetrically cut, the first rope (9) is assembled at the periphery of the netting and the rope (11) preinstalled the ultra high molecular weight polyethylene tube ring (10) is tied for preparing the isosceles trapezoid synthetic fiber netting standard component.

6. The method for constructing cage body of tapered cage assembled in rigid-flexible manner, as recited in claim 1, characterized in that: in step (3), the bottom net of the case body uses a high performance synthetic fiber diamond knotted netting, the netting is cut and assembled according to the shape and area of the bottom of the case body of the tapered cage, and the forced rope is radically assembled with a forced rope from a central point of the bottom net; a second rope (6) preinstalled with the tube ring formed by segment cutting the ultra high molecular weight polyethylene tube is located at the periphery of the bottom net, so that the ultra high molecular weight polyethylene tube ring (10) is evenly distributed according to the preset distance, and then the second rope (6) preinstalled with the tube ring is parallel laid outside the rope at the periphery of the bottom net, and tied with the second assembled rope (6) at the periphery of the bottom net by the high strength net cable for assembling the rope installed with the ultra high molecular weight polyethylene tube ring for preparing the bottom net which is capable of quickly connecting by staggered mating and penetrating the second synthetic fiber rope (6) into the tube ring.

7. The method for constructing cage body of tapered cage assembled in rigid-flexible manner, as recited in claim 1, characterized in that: the flexible synthetic fiber net (1) is a polyamide braided knotted net.

\* \* \* \* \*